United States Patent [19]
Fujita et al.

[11] Patent Number: 5,751,240
[45] Date of Patent: May 12, 1998

[54] FMCW RADAR SYSTEM FOR DETECTING DISTANCE, RELATIVE VELOCITY AND AZIMUTH OF A TARGET OBSTACLE

[75] Inventors: Akihiso Fujita, aichi-ken; Hiroshi Hazumi, Nagoya; Hiroshi Mizuno, Kariya; Hiroto Nakatani, Nagoya; Hiroshi Naganawa, Kagamigahara, all of Japan

[73] Assignee: Denso Corporation, Kariya, Japan

[21] Appl. No.: 764,627

[22] Filed: Dec. 11, 1996

[30] Foreign Application Priority Data

Dec. 11, 1995 [JP] Japan ................................. 7-321675
Jul. 9, 1996 [JP] Japan ................................. 8-179227

[51] Int. Cl.⁶ ........................... G01S 13/93; G01S 13/60
[52] U.S. Cl. .................... 342/70; 342/115; 342/127; 342/196; 342/107; 342/113; 342/133; 342/146
[58] Field of Search .................. 342/70, 71, 72, 342/99, 107, 113, 115, 127, 128, 133, 139, 146, 194, 196

[56] References Cited

U.S. PATENT DOCUMENTS

| | | | |
|---|---|---|---|
| 4,079,377 | 3/1978 | Heiden et al. | 342/109 |
| 4,464,662 | 8/1984 | Tomasi | 342/87 |
| 5,181,037 | 1/1993 | Komatsu | 342/70 |
| 5,270,720 | 12/1993 | Stove | 342/174 |
| 5,274,380 | 12/1993 | Yatsuka et al. | 342/70 |
| 5,341,144 | 8/1994 | Stove | 342/70 |
| 5,563,602 | 10/1996 | Stove | 342/70 |
| 5,619,208 | 4/1997 | Tamatsu et al. | 342/70 |
| 5,625,362 | 4/1997 | Richardson | 342/70 |

*Primary Examiner*—John B. Sotomayor
*Attorney, Agent, or Firm*—Cushman, Darby & Cushman IP Group of Pillsbury, Madison & Sutro LLP

[57] ABSTRACT

Beat signals of respective receiver channels CH1 and CH2, produced by mixing their receiving signals with a transmission signal, are subjected to Fourier transformation to detect the frequency and phase of peak frequency components in both an ascending-section where the frequency of the transmission increases and a descending-section where the frequency of the transmission decreases. Based on peak frequency components derived from the same target, phase differences $\Delta\phi u(i)$ and $\Delta\phi d(j)$ between receiver channels CH1 and CH2 in the ascending- and descending-sections (steps 210–230). Relative relationship between the transmission signal and the receiving signal is judged based on the signs of the phase differences. Respective peak frequencies $fu(i)$ and $fd(j)$, detected as absolute values of frequency differences between the transmission signal and the receiving signal, are given sings in accordance with the judgement result. Then, the distance D and relative velocity V of the target are calculated (steps 240–260).

4 Claims, 9 Drawing Sheets

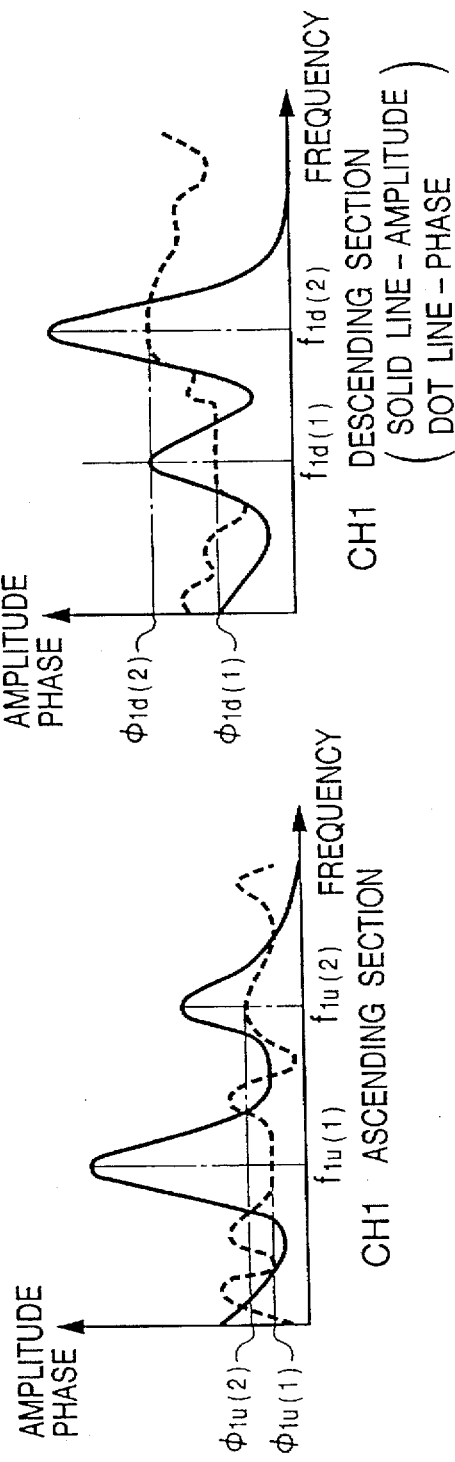
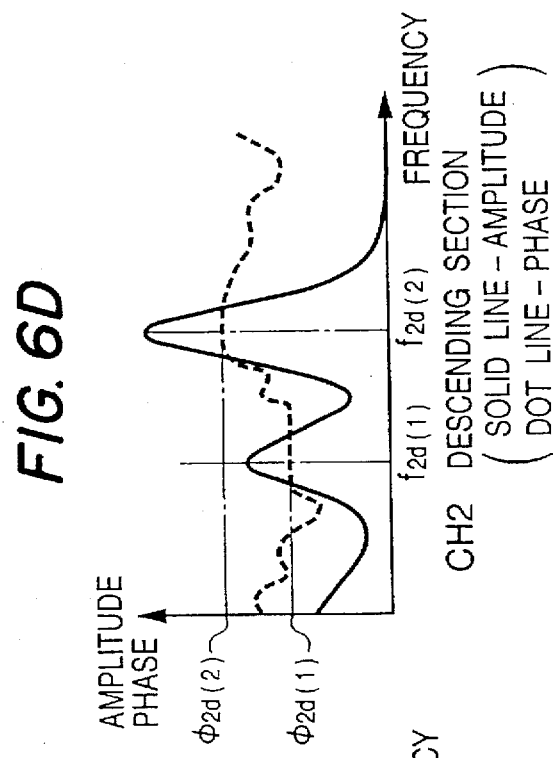
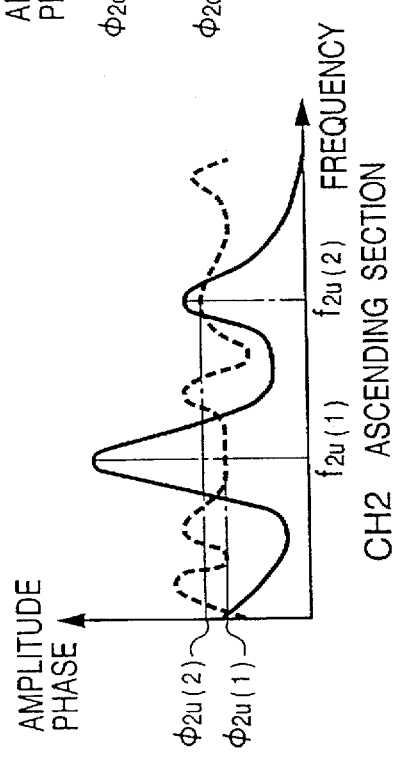

FMCW RADAR SYSTEM FOR DETECTING DISTANCE, RELATIVE VELOCITY AND AZIMUTH OF A TARGET OBSTACLE

BACKGROUND OF THE INVENTION

1. Field of the Invention

This invention relates to an FMCW (frequency modulated continuous wave) radar system used for preventing the collision of a mobile object such as an automotive vehicle or for automatic tracking cruise keeping a predetermined distance to a preceding mobile object, which transmits radar wave to a target obstacle and receives the reflected radar wave to detect the distance, relative velocity and azimuth with respect to the target obstacle.

2. Related Art

According to an FMCW radar system, a transmission signal is frequency-modulated by a triangular wave modulation signal with its gradually increasing and decreasing frequency. The frequency-modulated transmission signal is transmitted as a radar wave. Then, the FMCW radar receives the radar wave reflected from a target and mixes the receiving signal with the transmission signal to produce a beat signal. The beat signal is A/D converted and then subjected to the Fourier conversion using a signal processing unit such as a digital signal processor (DSP). The frequency of the beat signal (i.e. beat frequency) is identified in an ascending section where the frequency of the transmission signal is increasing and also in a descending section where the frequency of the transmission signal is decreasing, thereby obtaining beat frequency $f_u$ of the ascending section and beat frequency $f_d$ of the descending section. Based on the beat frequencies $f_u$ and $f_d$ the distance D and relative velocity V to the target are calculated based on the following equations (1) and (2).

$$D = \{C/(4 \cdot \Delta F \cdot fm)\} \cdot f_{dy} \quad (1)$$
$$= \{C/(8 \cdot \Delta F \cdot fm)\} \cdot (|f_u| + |f_d|)$$

$$V = \{C/(2 \cdot f0)\} \cdot f_{dp} = \{C/(4 \cdot f0)\} \cdot (|f_u| + |f_d|) \quad (2)$$

where $\Delta F$ represents a frequency deviation width of the transmission signal, f0 represents a central frequency of the transmission signal, 1/fm represents a time required for completing the modulation of one cycle, and C represents the speed of light.

According to the above-described equations (1) and (2), the distance D and relative velocity V are defined by the absolute values of the beat frequencies $f_u$ and $f_d$. This means that the distance D and relative velocity V are detected based on the absolute value of the difference between the frequency of the transmission signal (hereinafter, referred to as transmission frequency) and the frequency of the receiving signal (hereinafter, referred to as receiving frequency) irrespective of relative relationship between the transmission frequency and the receiving frequency.

Furthermore, fdy represents a frequency component (hereinafter, referred to as delay frequency) based on the delay caused when the radar wave goes and returns to and from the target. Meanwhile, fdp represents a frequency component (hereinafter, referred to as Doppler frequency) based on Doppler shift derived from the relative velocity of the target. Both of fdy and fdp are calculated from beat frequencies $f_u$ and $f_d$.

FIGS. 9A through 9C are graphs representing the relationship between the transmission frequency $f_s$ (solid line) and the receiving frequency $f_r$ (dot line). As shown in FIGS. 9A through 9C, the relative (size) relationship between the transmission frequency and the receiving frequency is basically classified into the following three patterns.

According to a first pattern shown in FIG. 9A, the transmission frequency $f_s$ is larger than the receiving frequency $f_r$ (i.e. $f_s > f_r$) in the ascending section, while the transmission frequency $f_s$ is smaller than the receiving frequency $f_r$ (i.e. $f_s < f_r$) in the descending section. According to a second pattern shown in FIG. 9B, the transmission frequency $f_s$ is always smaller than the receiving frequency $f_r$ (i.e. $f_s < f_r$) in both of the ascending section and the descending section. Furthermore, according to a third pattern shown in FIG. 9C, the transmission frequency $f_s$ is always larger than the receiving frequency $f_r$ (i.e. $f_s > f_r$) in both of the ascending section and the descending section.

A pattern opposed to FIG. 9A, wherein the transmission frequency $f_s$ is smaller than the receiving frequency $f_r$ (i.e. $f_s < f_r$) in the ascending section, while the transmission frequency $f_s$ is larger than the receiving frequency $f_r$ (i.e. $f_s > f_r$) in the descending section, does not exist because the receiving signal cannot be received prior to the transmission of the transmission signal.

The detected beat frequencies $f_u$ and $f_d$ do not reflect the relative (size) relationship between the transmission frequency $f_s$ and the receiving transmission frequency $f_r$. Hence, the distance D and relative velocity V to the target, i.e. delay frequency fdy and Doppler frequency fdp, are obtained differently in respective cases according to the following equations based on the beat frequencies $f_u$ and $f_d$.

TABLE 1

| RELATIVE RELATIONSHIP | | PARAMETERS | | |
|---|---|---|---|---|
| ASCEND SECTION | DESCEND SECTION | DELAY FREQ. fdy | DOPPLER FREQ. fdp | FIG |
| $f_s > f_r$ | $f_s < f_r$ | (|fu| + |fd|)/2 | (|fu| − |fd|)/2 | FIG. 9A |
| $f_s < f_r$ | $f_s < f_r$ | {(−|fu|) + |fd|}/2 = −(|fu| − |fd|)/2 | {(−|fu|) − |fd|}/2 = −(|fu| + |fd|)/2 | FIG. 9B |
| $f_s > f_r$ | $f_s > f_r$ | {|fu| + (−|fd|)}/2 = (|fu| − |fd|)/2 | {|fu| − (−|fd|)}/2 = (|fu| + |fd|)/2 | FIG. 9C |

Namely, the above-described equations (1) and (2) meet the case of FIG. 9A. In other words, these equations (1) and (2) are defined based on the assumption that the relative relationship between transmission frequency $f_s$ and receiving frequency $f_r$ is mostly shown by FIG. 9A. However, the relative relationship shown in FIGS. 9B and 9C can be established, although it is rare. Accordingly, if the transmission frequency $f_s$ and receiving frequency $f_r$ are in the relationship shown by FIGS. 9B and 9C, the distance D and relative velocity V to the target will be erroneously calculated.

For example, when the transmission signal's central frequency f0=60 [GHz], frequency deviation width $\Delta F$=75 [Mhz], repetition frequency fm=391 [Hz], target distance D=5 [m], and relative velocity V=−100 [km/h], the relationship between the transmission frequency $f_s$ and receiving frequency $f_r$ can be shown by FIG. 9B. In this case, beat frequencies $f_u$ and $f_d$ detected at the ascending section and the descending section are $f_u$=9156 [Hz] and $f_d$=13066 [Hz]. Using these values of beat frequencies $f_u$ and $f_d$, the distance D and relative velocity V can be obtained from equations (1) and (2), as D=28.4 [m] and V=−17.6 [km/h], which are incorrect.

In such a case, the relative relationship between transmission frequency $f_s$ and receiving frequency $f_r$ in the ascending section is opposite to that of equations (1) and (2).

Hence, to calculate the distance D and relative velocity V correctly, the beat frequency $f_u$ in the ascending section needs to be calculated as a negative value.

To eliminate practical problems in using the equations (1) and (2) for calculating the distance D and the relative velocity V, i.e. to eliminate the occurrence of the relative relationship between frequencies $f_s$ and $f_r$, it is necessary to shorten the repetition period 1/fm or to enlarge the frequency deviation width ΔF so as to increase the gradient of the frequency deviation.

FIG. 10A shows a case where the repetition period 1/fm of the frequency deviation of the transmission signal is enlarged to reduce the gradient of the frequency deviation. FIG. 10B shows a case where the repetition period 1/fm is shortened to increase the gradient of the frequency deviation. When the receiving signal (dot line) is delayed from the transmission signal (solid line) by the same time T in both cases, the delay frequency fdy becomes large with increasing gradient of the frequency deviation. In this respect, the case of FIG. 10B is advantageous to maintain the relative relationship between the transmission frequency and the receiving frequency. More specifically, when the same Doppler frequency fv is added to respective receiving frequencies of FIGS. 10A and 10B (alternate long and short dash line), the relative relationship between the transmission frequency and the receiving frequency can be maintained in FIG. 10B, while the relative relationship is changed in FIG. 10A.

However, the beat frequencies $f_u$ and $f_d$ become large with increasing gradient of the frequency deviation. This requires A/D converters to perform the sampling operation speedily. A/D converters and signal processors are expensive when they are capable of performing high-speed processing.

More specifically, beat frequencies $f_u$ and $f_d$ are expressed by the sum and difference between delay frequency fdy and Doppler frequency fdp. Thus, when the gradient of the frequency deviation is increased to enlarge the delay frequency fdy, the beat frequencies $f_u$ and $f_d$ are necessarily increased.

In general, increasing the gradient of the frequency deviation is effective to prevent erroneous detections. However, the conditions represented by FIGS. 9B and 9C occur when the Doppler frequency fdp exceeds the delay frequency fdy. The delay frequency fdy decreases with reducing distance to the target. Hence, when the distance to the target is reduced to a certain level, the Doppler frequency fdp always exceeds the delay frequency fdy even if the gradient of the frequency deviation is enlarged greatly. Thus, it is impossible to perfectly eliminate erroneous detections.

SUMMARY OF THE INVENTION

Accordingly, in view of above-described problems encountered in the related art, a principal object of the present invention is to provide a novel and excellent FMCW radar system which is capable of accurately detecting the distance, relative velocity, or azimuth of a target irrespective of the relative relationship between the transmission frequency and the receiving signal.

In order to accomplish this and other related objects, the present invention provides the FMCW radar system having various aspects which will be described hereinafter with reference to numerals in parentheses which show the correspondence to the components of the preferred embodiments described later. Reference numerals in parentheses, added in the following description, are merely used for the purpose of helping the understanding to the present invention and not used for narrowly interpreting the scope of claims of the present invention.

According to an aspect of the present invention, an FMCW radar system comprises transmitting means (12), a plurality of receiving means (14, 16), analysis means (28), frequency detecting means (26, step 150), and target detecting means (26, step 190). The transmitting means (12) generates a transmission signal having a modulated frequency variable in accordance with a triangular-wave modulation signal, and sending out radar wave carrying the transmission signal. The plurality of receiving means (14, 16) receive the radar wave when the radar wave is reflected from a target, generate receiving signals, and produce beat signals by mixing the receiving signals with the transmission signal. The analysis means (28) is provided for the plurality of receiving means to execute Fourier transformation of the beat signals. The frequency detecting means (26, step 150) is associated with the plurality of receiving means for detecting peak frequency components having peaks on a frequency spectrum based on analysis result of the beat signals obtained from the analysis means, in both an ascending-section modulation where the frequency of the transmission signal increases and a descending-section modulation where the frequency of the transmission signal decreases. The target detecting means (26, step 190) calculates at least one of distance and relative velocity of the target using predetermined equation defined by a parameter equivalent to a sum or a difference between the peak frequency components detected by the frequency detecting means in respective modulation.

Furthermore, as characteristic features, the FMCW radar system comprises phase calculating means (26, step 160), phase difference calculating means (26, steps 220, 230), and phase difference comparing means (26, step 240). More specifically, the phase calculating means (26, step 160) is associated with the plurality of receiving means for calculating phases of the peak frequency components detected by the frequency detecting means in respective modulations based on the analysis result obtained from the analysis means. The phase difference calculating means (26, steps 220, 230) calculate phase differences of peak frequency components between the plurality of receiving means in respective modulations based on the phases of the peak frequency components calculated by the phase calculating means. The phase difference comparing means (26, step 240) judges a relative relationship between the transmission signal and the receiving signal specified in respective modulations by comparing the phase differences of the peak frequency components calculated by the phase difference calculating means. Thus, the target detecting means obtains the parameter from peak frequencies which are given positive or negative sign in accordance with judgement result of the phase difference comparing means.

Hereinafter, the relative relationship between the transmission frequency and the receiving frequency as well as the phase difference relationship between peak frequency components will be explained. When fr represents the receiving frequency and fs represents the transmission frequency, the following equations (3) through (6) define a receiving signal R1(t) and a transmission signal S1(t) entered into a mixer of one receiving means and a receiving signal R2(t) and a transmission signal S2(t) entered into a mixer of another receiving means.

$$R1(t) = \sin\{2\pi fr \cdot t + \alpha 1\} \quad (3)$$

$$S1(t) = \sin\{2\pi fs \cdot t + \beta 1\} \quad (4)$$

$$R2(t) = \sin\{2\pi fr \cdot t + \alpha 2\} \quad (5)$$

$$S2(t) = \sin\{2\pi fs \cdot t + \beta 2\} \quad (6)$$

The value $(\alpha 2 - \alpha 1)$ is variable depending on the azimuth of a target, receiving antennas, wiring from the receiving antennas to the mixer, etc. The value $(\beta 2 - \beta 1)$ is variable depending on wiring to the mixer from an oscillator of the transmitter generating the transmission signal. However, the receiving frequency fr and the transmission frequency fs give no substantial effect to these values.

Beat signal (i.e. peak frequency component) B1(t) is expressed by the following equation (7) or (8), while beat signal B2(t) is expressed by the following equation (9) or (10). Its phase difference $\Delta\phi$ is expressed by the following equation (11) when fr is larger than fs, and is expressed by the following equation (12) when fr is smaller than fs.

$$B1(t) = (1/2) \cdot \cos \{2\pi \cdot (fr - fs) \cdot t + \alpha 1 - \beta 1\} \quad (7)$$
$$= (1/2) \cdot \cos \{2\pi \cdot (fs - fr) \cdot t - \alpha 1 + \beta 1\} \quad (8)$$
$$B2(t) = (1/2) \cdot \cos \{2\pi \cdot (fr - fs) \cdot t + \alpha 2 - \beta 2\} \quad (9)$$
$$= (1/2) \cdot \cos \{2\pi \cdot (fs - fr) \cdot t - \alpha 2 + \beta 2\} \quad (10)$$
(i) when $fr > fs$, using equations (7) and (9),
$$\Delta\phi = (\alpha 2 - \beta 2) - (\alpha 1 - \beta 1) \quad (11)$$
$$= (\alpha 2 - \alpha 1) - (\beta 2 - \beta 1)$$
(ii) when $fr < fs$, using equations (8) and (10),
$$\Delta\phi = (-\alpha 2 + \beta 2) - (-\alpha 1 + \beta 1) \quad (12)$$
$$= -\alpha 2 + \alpha 1 + \beta 2 - \beta 1$$
$$= -\{(\alpha 2 - \alpha 1) - (\beta 2 - \beta 1)\}$$

As explained above, $(\alpha 2 - \alpha 1)$ and $(\beta 2 - \beta 1)$ are not influenced by the receiving frequency fr and the transmission frequency fs, and will be regarded as constant values during a short period of time if the direction of the target does not cause substantial change. For example, these values do not change during a series of modulation consisting of an ascending modulation and a descending modulation sequentially performed.

Accordingly, it is understood, for the above-described short period of time, that the sign of phase difference $\Delta\phi$ between beat signals B1(t) and B2(t) will be reversed if the relative relationship (i.e. large or small) between transmission frequency fs and receiving frequency fr is reversed.

Hence, when the phase difference $\Delta\phi$ between bear signals B1(t) and B2(t) is differentiated in the ascending and descending modulations, it is judged that the relative relationship between transmission frequency fs and receiving frequency fr is reversed in the ascending and descending modulations (i.e. the condition of FIG. 9A). On the other hand, when the phase difference $\Delta\phi$ is identical in the ascending and descending modulations, it is judged that the relative relationship between transmission frequency fs and receiving frequency fr is not changed in the ascending and descending modulations (i.e. the condition of FIG. 9B or 9C).

In this respect, the FMCW radar system of the present invention can judge the relative relationship (i.e. which is large or small) between the transmission frequency and the receiving frequency. Thus, based on the detected relationship, signs of the peak frequencies are adequately given to obtain a parameter equivalent to the sum or difference of these peak frequencies. Hence, the present invention makes it possible to realize an excellent an reliable target obstacle detection capable of accurately calculating the distance and/or relative velocity of the target no matter which is large between the transmission frequency and the receiving frequency.

Moreover, the present invention allows the conditions of FIGS. 9B and 9C to exist in the target obstacle detection. Therefore, there is no necessity of excessively increasing the gradient of the frequency deviation of the transmission signal. This is effective in the Fourier transformation because the sampling speed needs not be increased in the A/D conversion of the beat signals. Processing or computation amount in the Fourier transformation can be adequately suppressed. And, the radar system can be compact in size and manufactured at low costs.

According to the features of preferred embodiments, the target detecting means comprises parameter calculating means (26, steps 250, 260), distance calculating means (26, steps 250, 260), velocity calculating means (26, steps 250, 260), and sign reversing means (26, steps 270, 280).

More specifically, the parameter calculating means (26, steps 250, 260) calculates the parameter by putting positive and negative signs to the peak frequencies in respective modulations when the phase differences of the peak frequency components in respective modulations are judged to be substantially equal. Meanwhile, the parameter calculating means (26, steps 270, 280) calculate the parameter by putting positive signs to the peak frequencies in respective modulations when the phase differences of the peak frequency components in respective modulations are judged to be different from each other. The distance calculating means (26, steps 250, 260) calculates the distance to the target based on the sum of peak frequencies calculated by the parameter calculating means. The velocity calculating means (26, steps 250, 260) calculates the relative velocity of the target based on the difference between peak frequencies calculated by the parameter calculating means. The sign reversing means (26, steps 270, 280) reverses the signs of calculation result of the distance calculating means and the velocity calculating means when the calculation result of the distance calculating means is negative.

Furthermore, it is preferable that the FMCW radar system further comprises peak pair specifying means (26, step 210) for specifying a peak frequency component during the ascending-section modulation and a peak frequency component during the descending-section modulation as a pair of peak frequency components derived from the same radar wave reflected from the same target, from a plurality of peak frequency components detected by the frequency detecting means in respective modulations, when the receiving means simultaneously receives radar waves reflected from different targets. In this case, the phase difference calculating means (26, steps 220, 230) calculates the phase differences of peak frequency components of the same frequency between the plurality of receiving means in each modulation. The phase difference comparing means (26, step 240) compares the phase difference of each pair of peak frequency components specified by the peak pair specifying means. And, the target detecting means (26, step 190) obtains the distance and relative velocity of each target based on each pair of peak frequency components specified by the peak pair specifying means.

Moreover, it is preferable that the peak pair specifying means (26, step 210) compares absolute values of phase differences calculated by the phase difference calculating means in the ascending-section modulation and the descending-section modulation, and specifies the pair of peak frequency components having the same absolute value in the phase differences.

BRIEF DESCRIPTION OF THE DRAWINGS

The above and other objects, features and advantages of the present invention will become more apparent from the following detailed description which is to be read in conjunction with the accompanying drawings, in which:

FIGS. 6A and 6B are graphs showing spectrums of beat signals calculated based on the FFT result in accordance with the first embodiment of the present invention;

DETAILED DESCRIPTION OF THE PREFERRED EMBODIMENTS

Figure 1:
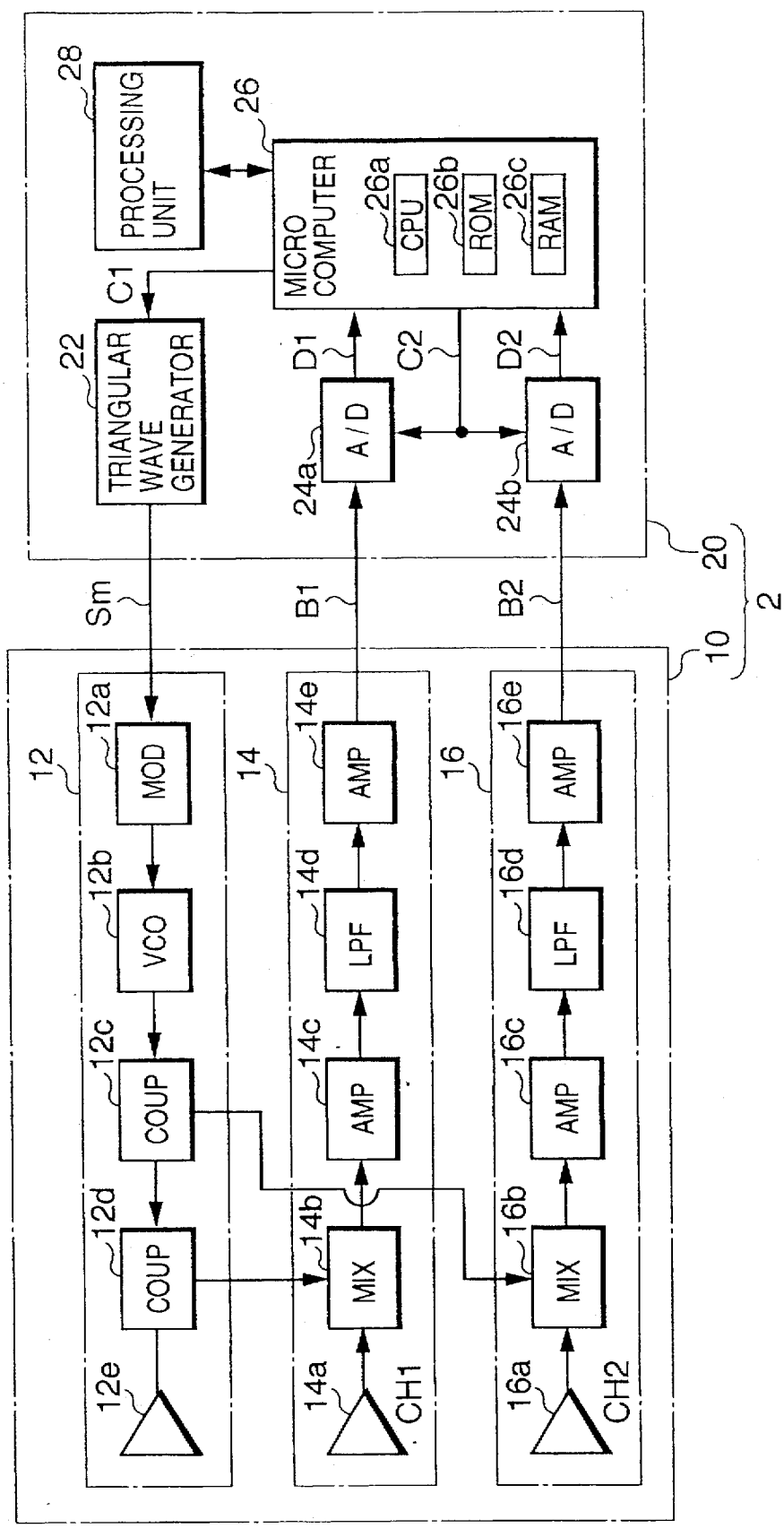
FIG. 1 is a schematic block diagram showing an overall arrangement of a radar system in accordance with a first embodiment of the present invention.

Preferred embodiments of the present invention will be explained in greater detail hereinafter with reference to the accompanying drawings. Identical parts are denoted by the same reference numerals throughout the views.

FIG. 1 is a schematic block diagram showing an overall arrangement of a radar system in accordance with a first embodiment of the present invention. As shown in FIG. 1, a radar system 2 of the first embodiment consists of a transmitter-receiver section 10 and a signal processing section 20. Transmitter-receiver section 10 comprises a transmitter 12 sending out or emitting radar wave having a predetermined frequency modulated in accordance with a modulation signal Sm, and a pair of receivers 14 and 16 receiving radar wave emitted from transmitter 12 and reflected from a target obstacle. Signal processing section 20 supplies the modulation signal Sm to transmitter 12, and performs the processing for detecting the obstacle target based on intermediate-frequency beat signals B1 and B2 generated from receivers 14 and 16.

Transmitter 12 acts as transmitting means of the present invention. Receivers 14 and 16 act as receiving means of the present invention.

According to the first embodiment, the radar system is installed in an automotive vehicle to detect a target obstacle existing in front of the automotive vehicle. Transmitter-receiver section 10 is placed at the front side of a vehicle body, while signal processing section 20 is disposed at a predetermined position in or near a passenger compartment.

Transmitter 12 comprises a voltage-controlled oscillator (VCO) 12b generating a high-frequency signal of milliwave band as a transmission signal, a modulator (MOD) 12a converting modulation signal Sm to a signal having an adjustment level for a voltage-controlled oscillator 12b and sending this modulated signal to voltage-controlled oscillator 12b, power distributors (COUP) 12c and 12d generating local signals to be supplied to receivers 14 and 16 by power distributing the transmission signal generated from voltage-controlled oscillator 12b, and a transmitter antenna 12e emitting radar wave in accordance with the transmission signal.

Receiver 14 comprises a receiver antenna 14a receiving radar wave, a mixer 14b mixing the reception signal received by receiving antenna 14a with the local signal supplied from power distributor 12d, a preamplifier 14c amplifying an output of mixer 14b, a low-pass filter 14d removing unnecessary high-frequency components from the output of preamplifier 14c and extracting beat signal B1 representing a frequency difference component between the transmission signal and the reception signal, and a postamplifier 14e amplifying the magnitude of the beat signal B1 to a required level.

Similarly, receiver 16 comprises a receiver antenna 16a receiving radar wave, a mixer 16b mixing the reception signal received by receiving antenna 16a with the local signal supplied from power distributor 12c, a preamplifier 16c amplifying an output of mixer 16b, a low-pass filter 16d removing unnecessary high-frequency components from the output of preamplifier 16c and extracting beat signal B2 representing a frequency difference component between the transmission signal and the reception signal, and a postamplifier 16e amplifying the magnitude of the beat signal B2 to a required level. Receiver 14 is referred to as a receiver channel CH1, while receiver 16 is referred to as a receiver channel CH2.

On the other hand, signal processing section 20 comprises a triangular wave generator 22 generating modulation signal Sm of a triangular waveform in response to an activation signal C1, A/D converters 24a and 24b receiving beat signals B1 and B2 supplied from receivers 14 and 16 and converting them into digital data D1 and D2, as well as a micro computer 26 and a processing unit 28. Micro computer 26, chiefly consisting of CPU 26a, ROM 26b and RAM 26c, sends out activation signals C1 and C2 to operate triangular wave generator 22 and A/D converters 24a, 24b. Furthermore, micro computer 26 performs target obstacle detecting processing (later described) for detecting the distance, relative velocity and azimuth with respect to a target obstacle based on digital data D1 and D2 obtained through A/D converters 24a and 24b. Processing unit 28 performs the calculation of fast Fourier transformation (FFT) based on the command given from micro computer 26. Processing unit 28 acts as analysis means of the present invention.

A/D converters 24a and 24b operate their operations in response to activation signal C2, and convert the analog beat signals B1 and B2 into digital data D1 and D2 at predetermined time intervals, and write these digital data to a predetermined region of RAM 26c. When a predetermined number of A/D conversions are entirely finished, A/D converters 24a and 24b set a termination flag (not shown) on RAM 26c and stop their operations.

When triangular wave generator 22 is activated in response to activation signal C1, modulation signal Sm is entered through modulator 12a to voltage-controlled oscillator 12b. Voltage-controlled oscillator 12b generates the transmission signal modulated in response to modulation signal Sm. More specifically, the frequency of the transmission signal increases in proportion to the ascending gradient of the triangular waveform of modulation signal Sm (this section is referred to as "ascending section"), while the frequency of the transmission signal decreases in proportion to the descending gradient of the triangular waveform of modulation signal Sm (this section is referred to as "descending section").

Figure 2:
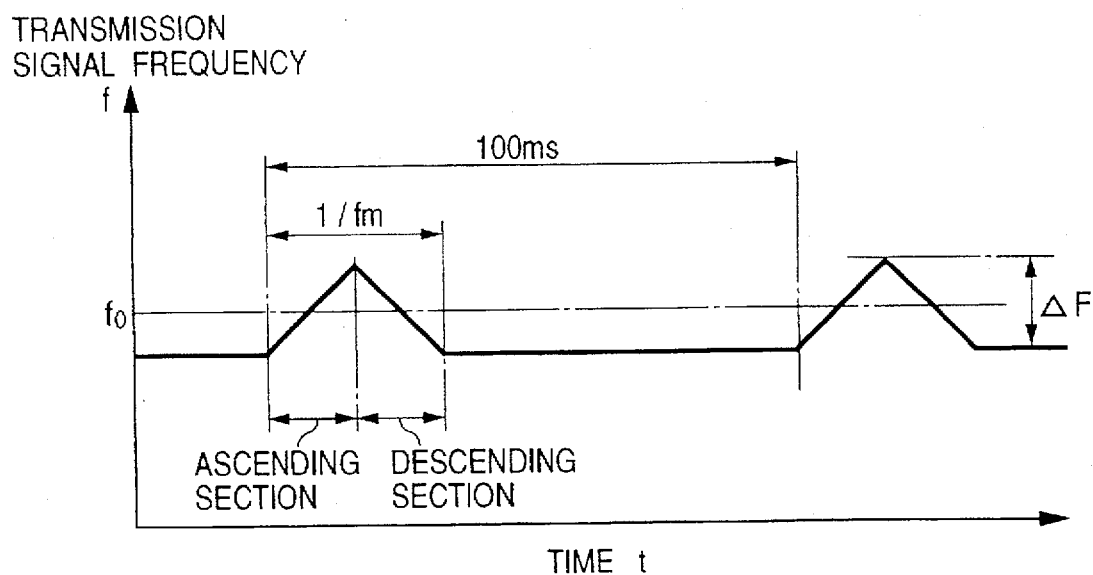
FIG. 2 is a waveform view showing the change of the frequency of a transmission signal in accordance with the first embodiment of present invention.

FIG. 2 is a view showing the modulation of the transmission signal. As shown in FIG. 2, the frequency of the transmission signal is increased or decreased by an amount ΔF during a time interval of 1/fm in response to modulation signal Sm. The center of this frequency variation is f0. In FIG. 2, a time interval of 100 ms is a period (time interval for one cycle) of the later-described target obstacle detecting processing. Activation signal C1 is generated during the target obstacle detecting processing.

Transmitter 12 generates radar wave in accordance with this transmission signal. The radar wave, after it is reflected from a target obstacle, comes back toward radar system 2 and is received by receivers 14 and 16. Receivers 14 and 16 mix the reception signals obtained from antennas 14a and 16a with the transmission signal obtained from transmitter 12, thereby producing beat signals B1 and B2. In this case, the reception signal is delayed from the transmission signal by a time required for the radar wave going from radar system 2 to the target obstacle and returning from the target obstacle to radar system 2. Furthermore, if there is any speed difference between radar system 2 and the target obstacle, the reception signal will be subjected to Doppler shift.

Figure 3:
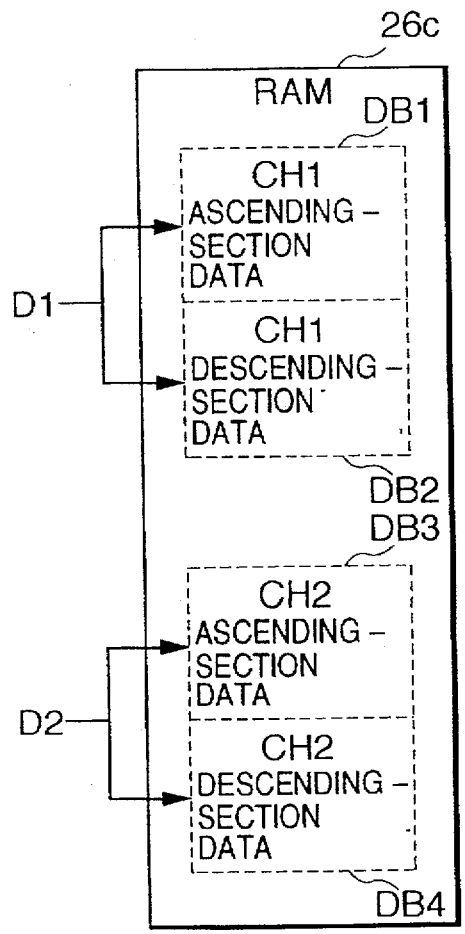
FIG. 3 is view illustrating data stored in RAM in accordance with the first embodiment of present invention.

As shown in FIG. 3, digital data D1, produced from A/D converter 24a by A/D converting beat signal B1, are successively stored in data blocks DB1 and DB2 of RAM 26c. In the same manner, digital data D2, produced from A/D converter 24b by A/D converting beat signal B2, are successively stored in data blocks DB3 and DB4 of RAM 26c.

In this case, A/D converters 24a and 24b start their operations in response to the activation of triangular wave generator 22 and perform a predetermined number of A/D conversions during a period of time corresponding to the generation of modulation signal Sm. Hence, data blocks DB1 and DB3 storing the first half of the data, store the ascending-section data corresponding to the ascending section of the transmission signal. Data blocks DB2 and DB4 storing the second half of the data, store the descending-section data corresponding to the descending section of the transmission signal.

The data stored in each of data blocks DB1 through DB4 is processed by micro computer 26 and processing unit 28 to detect the target obstacle.

Next, the target obstacle detecting processing executed by CPU 26a of micro computer 26 will be explained with reference to the flow chart of FIG. 4. As described previously, the target obstacle detecting processing of this embodiment is performed at the time intervals of 100 ms.

Figure 4:
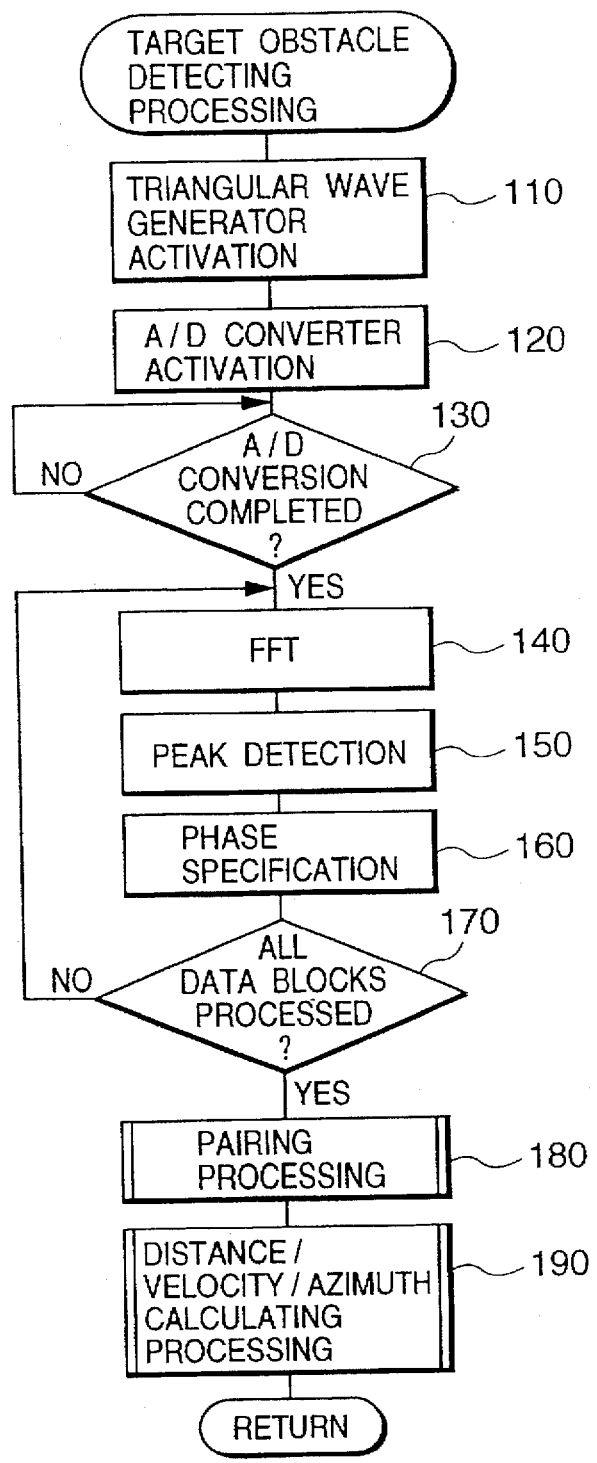
FIG. 4 is a flow chart explaining the details of target obstacle detecting processing in accordance with the first embodiment of the present invention.

As shown in FIG. 4, after starting this processing, activation signal C1 is generated in step 110 to activate triangular wave generator 22. Then, in step 120, the termination flag on RAM 26c is cleared and activation signal C2 is generated to activate A/D converters 24a and 24b.

With this procedure, modulation signal Sm is generated from triangular wave generator 22. Transmitter 12, when it receives the modulation signal Sm, transmits the radar wave having the modulated frequency. When the radar wave is reflected from the target obstacle and received by receivers 14 and 16, beat signals B1 and B2 are generated and converted into digital data D1 and D2 through A/D converters 24a and 24b, and then written to RAM 26c.

In the succeeding step 130, the termination flag on RAM 26c is checked to make a judgement as to whether or not A/D conversion is finished entirely. If the termination flag is not set (i.e. when the A/D conversion is not finished yet), step 130 is repetitively executed. If the termination flag is set (i.e. when the A/D conversion is completely finished), the control flow proceeds to step 140.

In step 140, data blocks DB1 to DB4 on RAM 26c are successively selected and the data of each data block DBi (i=1 to 4) are entered into processing unit 28 to execute the fast Fourier transformation. The data entered in processing unit 28 are subjected to conventional window processing using a Hanning window or a triangular window or the like to suppress the side lobe appearing in the calculation of the fast Fourier transformation. The frequency spectrum data obtained through this FFT calculation are complex vectors in relation to frequency.

In step 150, a peak of each frequency spectrum is detected based on the absolute value of the complex vector, i.e. an amplitude of the frequency component shown by the complex vector. The frequency corresponding to the detected peak is specified as a peak frequency. Regarding the method of detecting the peak, it will be possible to successively obtain the momentary variation of the amplitude with respect to the frequency and find out a specific frequency before and after which the sign of the momentary variation is inverted.

In step 160, the phase of the peak frequency component specified in step 150 is calculated. This phase is identical with the angle formed between the complex vector and the real axis; therefore, it can be simply obtained from the complex vector.

In the next step 170, it is checked whether there is any data block Dbi not yet processed. If there is any unprocessed data block Dbi, the control flow returns to step 140 and executes the processing of steps 140 to 160 with respect to the unprocessed data block Dbi. On the other hand, when all of data blocks are thoroughly processed, the control flow proceeds to step 180.

FIGS. 6A and 6B show the amplitude (i.e. power) and phase spectrums of each frequency component based on the complex vector obtained as a result of the calculation in step 140 in each data block DB1 through DB4, i.e. in each of the ascending-section data and descending-section data of receiver channels CH1 and CH2. In this embodiment, it is assumed that there are two target obstacles. Hence, two peak frequency components are detected in the frequency spectrum of each data block Dbi (i=1 to 4).

Executing the above-described steps 150 and 160 obtains, as a result, peak frequencies f1u(1) and f1u(2) at the ascending section and peak frequencies f1d(1) and f1d(2) at the descending section of the receiver channel CH1, as well as peak frequencies f2u(1) and f2u(2) at the ascending section and peak frequencies f2d(1) and f2d(2) at the descending section of the receiver channel CH2. Furthermore, phases φ1u(1), φ1u(2), φ1d(1), φ1d(2), φ2u(1), φ2u(2), φ2d(1), and φ2d(2) are obtained as corresponding to these peak frequencies f1u(1), f1u(2), f1d(1), f1d(2), f2u(1), f2u(2), f2d(1), and f2d(2), respectively.

Between receiver channels CH1 and CH2, some peak frequency components are substantially identical with each other in the ascending and descending sections (i.e. f1u(1)=f2u(1), f1u(2)=f2u(2), f1d(1)=f2d(1), f1d(2)=f2d(2)). The corresponding peak frequency components, referred to as fu(i) and fd(j), are based on the radar wave reflected from the same target obstacle.

In the next step 180, in each of the ascending and descending sections, pairing processing is executed to specify a pair of peak frequency components derived from the radar wave reflected from the same target obstacle as having the same power by comparing the amplitudes of the peak frequency components.

According to FIGS. 6A and 6B, peak frequencies fu(1) and fd(2) are specified as one pair while peak frequencies fu(2) and fd(1) are specified as another pair by the pairing processing.

In the next step 190, distance/velocity/azimuth calculating processing is executed using the peak frequencies paired in step 180 to calculate the distance, relative velocity and azimuth of the target obstacle. Then, the main routine is terminated.

Figure 5:
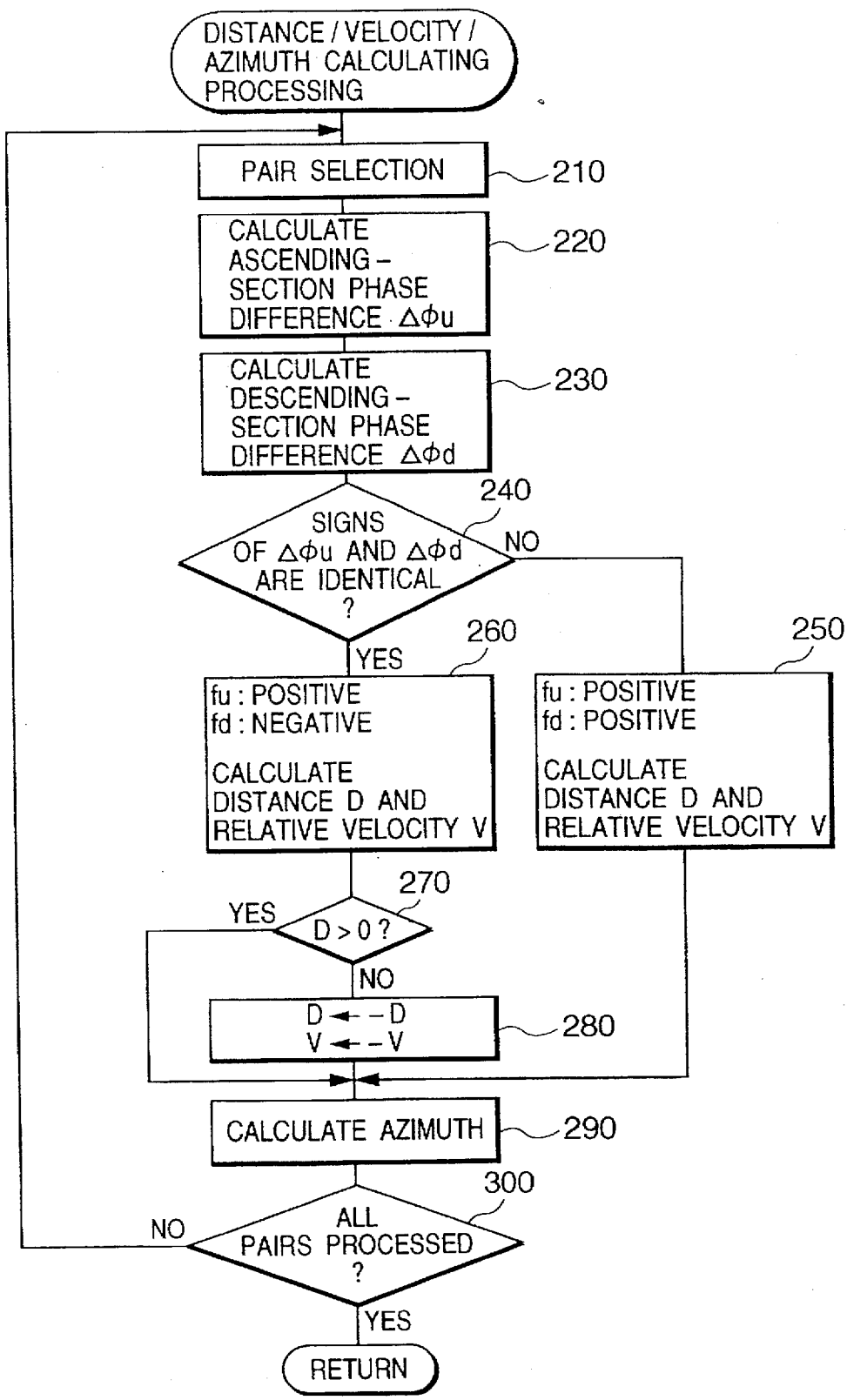
FIG. 5 is a flow chart explaining the details of distance/velocity/azimuth calculating processing in accordance with the first embodiment of the present invention.

FIG. 5 shows the detail of the distance/velocity/azimuth calculating processing. First, in step 210, one pair is selected from the paired peak frequency components. Next, in step 220, phase difference $\Delta\phi u(i)$ in the ascending section between receiver channels CH1 and CH2 is calculated using the following equation (13). Then, in step 230, phase difference $\Delta\phi d(j)$ in the descending section between receiver channels CH1 and CH2 is calculated using the following equation (14).

$$\Delta\phi u(i) = \phi 1u(i) - \phi 2u(i) \qquad (13)$$

$$\Delta\phi d(j) = \phi 1d(j) - \phi 2d(j) \qquad (14)$$

In the next step 240, a judgement is made to check whether or not the phase differences $\Delta\phi u(i)$ and $\Delta\phi d(j)$ have the same sign. When the phase differences $\Delta\phi u(i)$ and $\Delta\phi d(j)$ have mutually different signs ("NO" in step 240), the control flow proceeds to step 250. In step 250, both of signs of peak frequency fu(i) (=f1u(i)=f2u(i)) and peak frequency fd(j) (=f1d(j)=f2d(j)) are regarded as positive. Then, the distance D and relative velocity V to the target obstacle are calculated using the equations (1) and (2).

On the other hand, when the phase differences $\Delta\phi u(i)$ and $\Delta\phi d(j)$ have mutually identical signs ("YES" in step 240), the control flow proceeds to step 260. In step 260, the sign of the ascending-section peak frequency fu(i) is regarded as positive while the sign of the descending-section peak frequency fd(j) is regarded as negative. Then, the distance D and relative velocity V to the target obstacle are calculated using the following modified equations (1') and (2').

$$D = \{C/(8 \cdot \Delta F \cdot fm)\} \cdot (|f_u| + (-|f_d|)) \qquad (1')$$

$$V = \{C/(4 \cdot f0)\} \cdot (|f_u| - (-|f_d|)) \qquad (2')$$

In the next step 270, it is checked whether or not the distance D calculated in step 260 is positive. When the calculate distance D is positive, the control flow proceeds to step 290. When the calculate distance D is not positive, the control flow proceeds to step 280. In step 280, the signs of distance D and relative velocity V calculated in the step 260 are reversed. Then, the control flow proceeds to the step 290.

In step 290, an azimuth $\theta$ of the target obstacle corresponding to each peak frequency component is calculated based on the phase difference $\Delta\phi u(i)$ calculated in step 220, using the following equation (15).

$$\theta = \Delta\phi u(i) \cdot \lambda / (2\pi \cdot W) \qquad (15)$$

where W represents the distance between receivers 14 and 16, and $\lambda$ represents the wavelength of the radar wave. In the equation (15), $\Delta\phi u(i)$ can be replaced by the descending-section phase difference $\Delta\phi d(j)$ calculated in step 230.

In the next step 300, a judgement is made to check whether the distance D, relative velocity V and azimuth $\theta$ are calculated for all of the peak frequency components paired in the pairing processing in step 180. When all pairs are not finished yet, the control flow returns to step 210 to calculate the distance D, relative velocity V and azimuth $\theta$ for each of the non-calculated pairs of the peak frequency components. Then, when all the pairs of the peak frequency components are thoroughly processed, this routine is terminated.

Figure 9A:
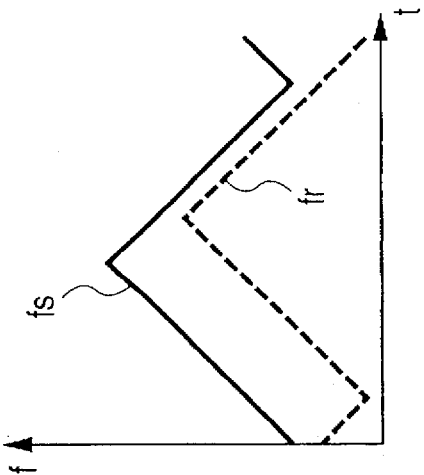
FIGS. 9A, 9B and 9C are graphs showing the relative relationship between the transmission frequency and the receiving frequency in a FMCW radar.
Figure 9B:
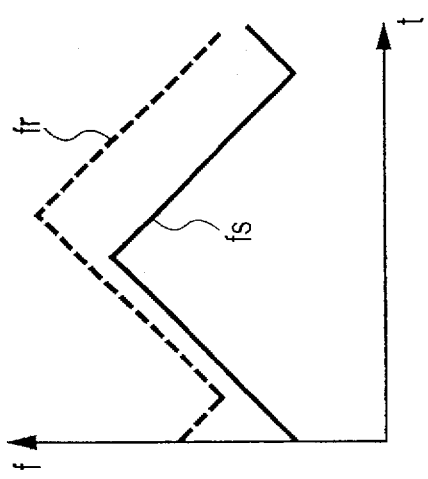
Figure 9C:
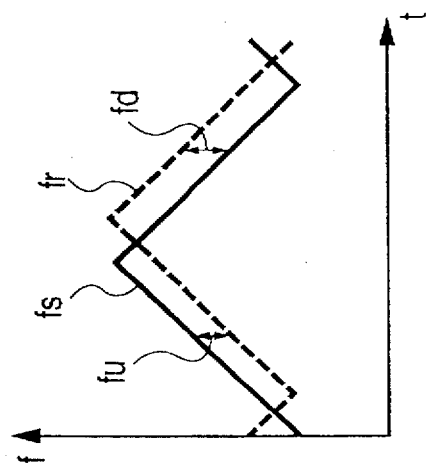
Figure 10B:
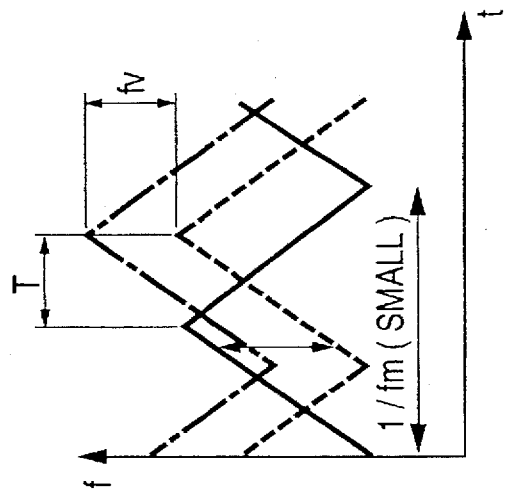
FIGS. 10A and 10B are graphs explaining the problem in the target detection of the FMCW radar.
Figure 10A:
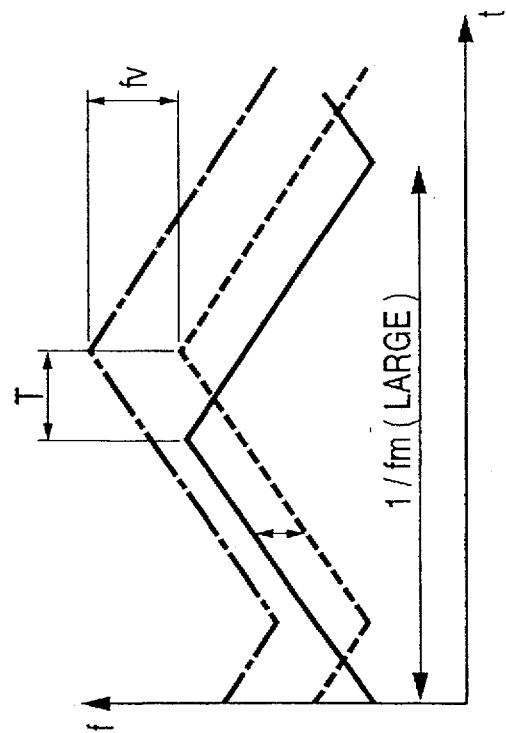

According to FIG. 6, the phase differences $\Delta\phi u(1) = \phi 1u(1) - \phi 2u(1)$ and $\Delta\phi d(2) = \phi 1d(2) - \phi 2d(2)$ are derived from the pair of beat frequencies fu(1) and fd(2). In this case, both of the phase differences $\Delta\phi u(1)$ and $\Delta\phi d(2)$ have negative signs. Hence, the relative relationship between the transmission frequency and the receiving frequency is judged to be in the situation of FIG. 9B or FIG. 9C. Thus, the distance D and relative velocity V can be correctly calculated using equations (1') and (2').

As explained previously, according to the example in the related art, the distance D and relative velocity V are erroneously calculated from equations (1) and (2) as D=28.4 [m] and V=−17.6 [km/h]. On the other hand, according to the embodiment of the present invention, the relative relationship between the transmission frequency and the receiving frequency is correctly judged based on the signs of the phase differences $\Delta\phi u(i)$ and $\Delta\phi d(j)$ calculated in the ascending and descending sections. In the above case, the signs of the phase differences $\Delta\phi u(i)$ and $\Delta\phi d(j)$ are detected as identical. The distance D and relative velocity V are calculated from the equations (1') and (2') which put negative signs to the descending-section beat frequencies. As a result of calculation, D=−5 [m] and V=100 [km/h]. The signs of the calculation values are reversed in this case, because the distance D must have a positive value. As a result, finally obtained result is D=5 [m] and V=−100 [km/h]. Thus, correct result is derived.

The distance D, relative velocity V and azimuth $\theta$ to the target obstacle thus calculated are used in an independently executed judging processing for judging the presence of any danger. If there is any danger, an alarm (not shown) will be activated to notify a driver of the danger.

In the above-described embodiment, CPU 26 acts as frequency detecting means of the present invention when performing the processing of step 150, as phase calculating means when performing the processing of step 160, as phase difference calculating means when performing the processing of steps 220 and 230, as phase difference comparing means when performing the processing of step 240, as parameter calculating means, distance calculating means and velocity calculating means when performing the processing of steps 250 and 260, as sign reversing means when performing the processing of steps 270 and 280.

As explained in the foregoing description, the radar system 2 of the first embodiment of the present invention obtains phase differences $\Delta\phi u(i)$ and $\Delta\phi d(j)$ between receiver channels CH1 and CH2 in the ascending and descending sections with respect to the peak frequency components derived from the radar wave reflected from the same target obstacle, judges the relative relationship between the transmission frequency and the receiving frequency by comparing the signs of these phase differences $\Delta\phi u(i)$ and $\Delta\phi d(j)$, gives sign to the beat frequency detected as an absolute value of the difference between the transmission frequency and the receiving frequency, and calculates the distance D, relative velocity V and azimuth $\theta$ of the target obstacle based on the beat frequency given the sign in this manner.

Accordingly, even if the relative relationship between the transmission signal and the receiving signal is different from the premise condition for defining the equations (1) and (2) that the transmission frequency is larger than the receiving frequency in the ascending section while the transmission frequency is smaller than the receiving frequency in the descending section, the radar system 2 of the first embodiment of the present invention can accurately calculate the distance D, relative velocity V and azimuth $\theta$ of the target obstacle. Thus, it becomes possible to realize a reliable radar system for detecting a target obstacle without any erroneous detection.

According to the above-described first embodiment, when the signs of phase differences $\Delta\phi u(i)$ and $\Delta\phi d(j)$ are identical, a positive sign is given to the ascending-section beat frequency fu(i) and a negative sign is given to the descending-section beat frequency fd(j) in the step 260. Needless to say, it is possible to give a negative sign to the ascending-section beat frequency fu(i) and give a positive sign to the descending-section beat frequency fd(j).

Alternatively, it is also possible to allow the above-described two kinds of combinations of signs, so that two kinds of combinations of distance D and relative velocity V are obtained by using the following equations (1") and (2") in addition to the previously-described equations (1") and (2"), and then select one combination having the distance D of a positive value.

$$D = \{C/(8\cdot\Delta F\cdot fm)\}\cdot((-|f_u|)+|f_d|) \quad (1")$$

$$V = \{C/(4 f0)\}\cdot((-|f_u|)-|f_d|) \quad (2")$$

Next, a second embodiment of the present invention will be explained.

The second embodiment is different from the first embodiment in the content of pairing processing in the target obstacle detecting processing (step 180) and the content of distance/velocity/azimuth calculating processing (step 190). Other arrangement and processing are identical with those of the first embodiment. Hence, the pairing processing and the distance/velocity/azimuth calculating processing of the second embodiment will be explained in greater detail hereinafter.

Figure 7:
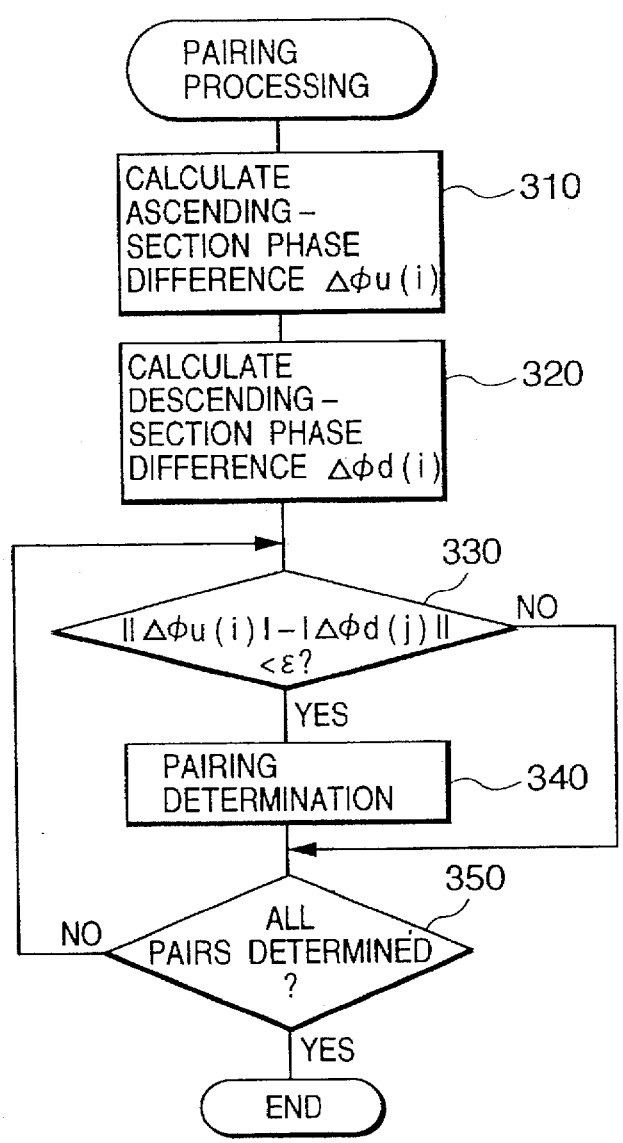
FIG. 7 is a flow chart showing the details of pairing processing in accordance with a second embodiment of the present invention.

FIG. 7 is a flow chart showing the details of the pairing processing in accordance with the second embodiment of the present invention.

As shown in FIG. 7, upon activation of this routine, in step 310, phase difference $\Delta\phi u(i)$ in the ascending section between receiver channels CH1 and CH2 is calculated using the following equation (16), as phase difference between peak frequency components having identical peak frequency, i.e. peak frequency components derived from the radar wave reflected from the same target obstacle. Then, in step 320, phase difference $\Delta\phi d(j)$ in the descending section between receiver channels CH1 and CH2 is calculated using the following equation (17), as phase difference between peak frequency components having identical peak frequency.

$$\Delta\phi u(i) = \phi 1u(i) - \phi 2u(i) \quad (16)$$

$$\Delta\phi d(j) = \phi 1d(j) - \phi 2d(j) \quad (17)$$

where i, j=1 to Np, and Np is the number of peak frequency components detected in the step 150.

In the next step 330, one peak frequency component is selected from each of the ascending section and the descending section. Then, using absolute values of the phase differences calculated in the steps 310 and 320, an absolute value of the difference between the absolute values of the phase differences is obtained as $||\Delta\phi u(i)|-|\Delta\phi d(j)||$. A judgement is made to check whether $||\Delta\phi u(i)|-|\Delta\phi d(j)||$ is smaller than a predetermined value $\epsilon$. When $||\Delta\phi u(i)|-|\Delta\phi d(j)||$ is smaller than $\epsilon$, it is judged that $|\Delta\phi u(i)|$ is substantially equal to $|\Delta\phi d(j)|$. Then, the control flow proceeds to step 340. On the other hand, when $||\Delta\phi u(i)|-|\Delta\phi d(j)||$ is not smaller than $\epsilon$, it is judged that $|\Delta\phi u(i)|$ is not equal to $|\Delta\phi d(j)|$. Then, the control flow proceeds to step 350.

In step 340, the peak frequency components, identified as having the same absolute values $|\Delta\phi u(i)|,|\Delta\phi d(j)|$, are designated as a pair. This pairing result is stored in a predetermined area of RAM 26c, together with the phase differences $\Delta\phi u(i)$ and $\Delta\phi d(j)$. Then, the control flow proceeds to step 350.

In step 350, it is judged as to whether the pairing operation is thoroughly finished for all of the peak frequency components. If there is any peak frequency components unpaired, the control flow returns to step 330 to repeat the processing of steps 330 through 350. When all of the pairing operation is completely finished at step 350, this routine is terminated.

Figure 8:
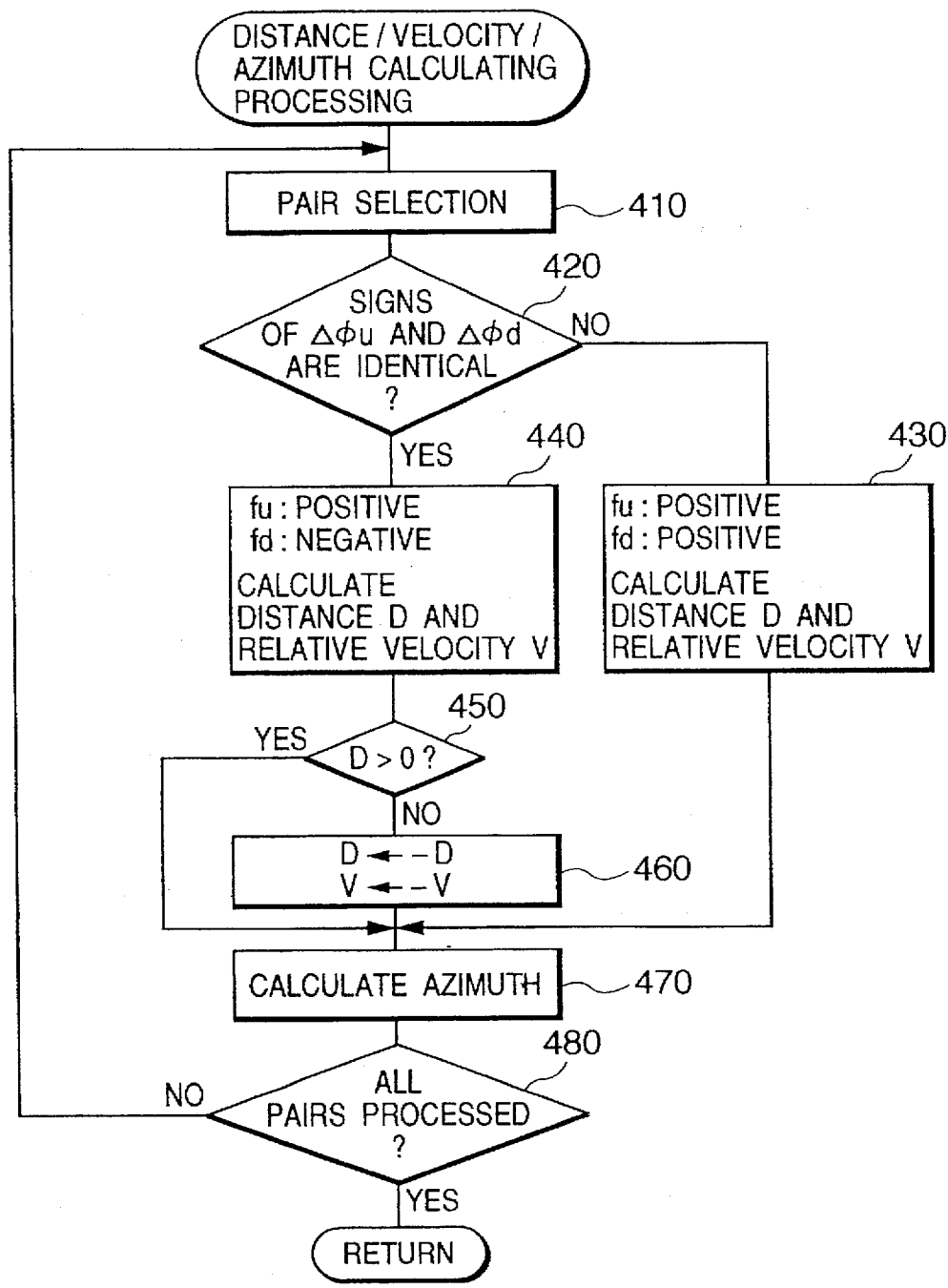
FIG. 8 is a flow chart explaining the details of distance/velocity/azimuth calculating processing in accordance with a second embodiment of the present invention.

FIG. 8 is a flow chart explaining the details of distance/velocity/azimuth calculating processing in accordance with the second embodiment of the present invention.

As shown in FIG. 8, in a step 410, one pair is selected from the paired peak frequency components obtained in the above-described pairing processing. Next, in step 420, phase differences $\Delta\phi u(i)$ and $\Delta\phi d(j)$ of the selected pair of peak frequency components in the ascending and descending sections are read from RAM 26c. And, a judgement is made to check whether or not these phase differences $\Delta\phi u(i)$ and $\Delta\phi d(j)$ have the same signs. When the phase differences $\Delta\phi u(i)$ and $\Delta\phi d(j)$ have mutually different signs ("NO" in step 420), the control flow proceeds to step 430. In step 430, both of signs of peak frequency fu(i) (=f1u(i)=f2u(i)) and peak frequency fd(j) (=f1d(j)=f2d(j)) are regarded as positive. Then, the distance D and relative velocity V to the target obstacle are calculated using the equations (1) and (2).

On the other hand, when the phase differences $\Delta\phi u(i)$ and $\Delta\phi d(j)$ have mutually identical signs ("YES" in step 420), the control flow proceeds to step 440. In step 440, the sign of the ascending-section peak frequency fu(i) is regarded as positive while the sign of the descending-section peak frequency fd(j) is regarded as negative. Then, the distance D and relative velocity V to the target obstacle are calculated using the following modified equations (1') and (2').

In the next step 450, it is checked whether or not the distance D calculated in step 440 is positive. When the calculate distance D is positive, the control flow proceeds to step 470. When the calculate distance D is not positive, the control flow proceeds to step 460. In step 460, the signs of distance D and relative velocity V calculated in the step 440 are reversed. Then, the control flow proceeds to the step 470.

In step 470, azimuth $\theta$ of the target obstacle corresponding to each peak frequency component is calculated based on the phase difference $\Delta\phi u(i)$ or $\Delta\phi d(j)$ used in the step 420.

In the next step 480, a judgement is made to check whether the distance D, relative velocity V and azimuth $\theta$ are calculated for all of the peak frequency components paired in the pairing processing. When all pairs are not finished yet, the control flow returns to step 410 to calculate the distance D, relative velocity V and azimuth $\theta$ for each of the non-calculated pairs of the peak frequency components. Then, when all the pairs of the peak frequency components are thoroughly processed, this routine is terminated.

As explained in the foregoing description, the FMCW radar system of this embodiment, in the pairing processing, performs the judgement of the pairs based on the absolute value of the phase differences of the peak frequency components, and memorizes the phase differences of the peak frequency components calculated in this processing and, in the distance/velocity/azimuth calculating step, uses the memorized data to calculate the distance D, relative velocity V and azimuth $\theta$ without calculating phase differences of the peak frequency components. Hence, the efficiency and speed of computations can be improved.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. An FMCW radar system comprising:

transmitting means for generating a transmission signal having a modulated frequency variable in accordance with a triangular-wave modulation signal, and sending out radar wave carrying said transmission signal;

a plurality of receiving means for receiving said radar wave when said radar wave is reflected from a target, generating receiving signals, and producing beat signals by mixing said receiving signals with said transmission signal;

analysis means provided for said plurality of receiving means for executing Fourier transformation of said beat signals;

frequency detecting means associated with said plurality of receiving means for detecting peak frequency components having peaks on a frequency spectrum based on analysis result of said beat signals obtained from said analysis means, in both an ascending-section modulation where the frequency of said transmission signal increases and a descending-section modulation where the frequency of said transmission signal decreases;

target detecting means for calculating at least one of distance and relative velocity of said target using predetermined equation defined by a parameter equivalent to a sum or a difference between the peak frequency components detected by said frequency detecting means in respective modulation;

phase calculating means associated with said plurality of receiving means for calculating phases of said peak frequency components detected by said frequency detecting means in respective modulations based on the analysis result obtained from said analysis means;

phase difference calculating means for calculating phase differences of peak frequency components between said plurality of receiving means in respective modulations based on the phases of said peak frequency components calculated by said phase calculating means;

phase difference comparing means for judging a relative relationship between said transmission signal and said receiving signal specified in respective modulations by comparing the phase differences of said peak frequency components calculated by said phase difference calculating means; and said target detecting means obtaining said parameter from peak frequencies which are given positive or negative sign in accordance with judgement result of said phase difference comparing means.

2. The FMCW radar system in accordance with claim 1, wherein said target detecting means comprises:

parameter calculating means for calculating said parameter by putting positive and negative signs to said peak frequencies in respective modulations when the phase differences of the peak frequency components in respective modulations are judged to be substantially equal, while calculating said parameter by putting positive signs to said peak frequencies in respective modulations when the phase differences of the peak frequency components in respective modulations are judged to be different from each other;

distance calculating means for calculating the distance to the target based on the sum of peak frequencies calculated by said parameter calculating means;

velocity calculating means for calculating the relative velocity of the target based on the difference between peak frequencies calculated by said parameter calculating means; and sign reversing means for reversing the signs of calculation result of said distance calculating means and said velocity calculating means when the calculation result of said distance calculating means is negative.

3. The FMCW radar system in accordance with claim 1, further comprising:

peak pair specifying means for specifying a peak frequency component during the ascending-section modulation and a peak frequency component during the descending-section modulation as a pair of peak frequency components derived from the same radar wave reflected from the same target, from a plurality of peak frequency components detected by said frequency detecting means in respective modulations, when said receiving means simultaneously receives radar waves reflected from different targets, wherein said phase difference calculating means calculates the phase differences of peak frequency components of the same frequency between said plurality of receiving means in each modulation, said phase difference comparing means compares the phase difference of each pair of peak frequency components specified by said peak pair specifying means, and said target detecting means obtains the distance and relative velocity of each target based on each pair of peak frequency components specified by said peak pair specifying means.

4. The FMCW radar system in accordance with claim 3, wherein said peak pair specifying means compares absolute values of phase differences calculated by said phase difference calculating means in said ascending-section modulation and said descending-section modulation, and specifies peak frequency components having the same absolute value in the phase differences as said pair of peak frequency components.

* * * * *

UNITED STATES PATENT AND TRADEMARK OFFICE
CERTIFICATE OF CORRECTION

PATENT NO. : 5,751,240
DATED : May 12, 1998
INVENTOR(S) : Fujita et al.

It is certified that error appears in the above-identified patent and that said Letters Patent is hereby corrected as shown below:

On the title page: Item [75]:

Inventors: (First Inventor) "Akihiso FUJITA"

should read:

Inventors: (First Inventor) "Akihisa FUJITA"

Signed and Sealed this

Eighth Day of September, 1998

Attest:

BRUCE LEHMAN

Attesting Officer          Commissioner of Patents and Trademarks